(12) United States Patent
Hu et al.

(10) Patent No.: US 10,299,197 B2
(45) Date of Patent: May 21, 2019

(54) WIRELESS FIDELITY CONNECTION METHOD, MOBILE TERMINAL AND STORAGE MEDIUM

(71) Applicant: GUANGDONG OPPO MOBILE TELECOMMUNICATIONS CORP., LTD., Dongguan, Guangdong (CN)

(72) Inventors: Yadong Hu, Dongguan (CN); Yi Yu, Dongguan (CN); Shimin Jiang, Dongguan (CN); Botao Cu, Dongguan (CN)

(73) Assignee: GUANGDONG OPPO MOBILE TELECOMMUNICATIONS CORP., LTD., Dongguang, Guangdong (CN)

( * ) Notice: Subject to any disclaimer, the term of this patent is extended or adjusted under 35 U.S.C. 154(b) by 44 days.

(21) Appl. No.: 15/794,388

(22) Filed: Oct. 26, 2017

(65) Prior Publication Data
US 2018/0242233 A1    Aug. 23, 2018

(30) Foreign Application Priority Data
Feb. 20, 2017    (CN) .......................... 2017 1 0091095

(51) Int. Cl.
*H04W 48/16* (2009.01)
*H04L 29/06* (2006.01)
(Continued)

(52) U.S. Cl.
CPC ............. *H04W 48/16* (2013.01); *H04L 29/06* (2013.01); *H04L 63/0428* (2013.01);
(Continued)

(58) Field of Classification Search
CPC ... H04W 48/16; H04W 64/00; H04W 64/006; H04W 48/20; H04W 84/12; H04L 29/06; H04L 63/0428
See application file for complete search history.

(56) References Cited

U.S. PATENT DOCUMENTS 7,567,819 B2    7/2009  Alone
8,831,643 B2    9/2014  Finlow-Bates
(Continued)

FOREIGN PATENT DOCUMENTS

CN    1485751 A    3/2004
CN    101202686 A    6/2008
(Continued)

OTHER PUBLICATIONS

International Search Report in international application No. PCT/CN2017/104776, dated Jan. 4, 2018.
(Continued)

*Primary Examiner* — Ajay Cattungal

(74) *Attorney, Agent, or Firm* — Ladas & Parry LLP

(57) ABSTRACT

An embodiment provides a Wireless Fidelity (Wi-Fi) connection method and a mobile terminal. The method includes: Wi-Fi scanning is performed to obtain Access Point (AP) information of M APs; the AP information of N APs, of which signal strengths are higher than a first preset threshold value are selected from the AP information of the M APs, to generate a target Wi-Fi list; X Wi-Fi lists are determined from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists; and at least one Service Set Identifier (SSID) or Basic Service Set Identifier (BSSID) is selected in the X Wi-Fi lists to perform Wi-Fi scanning.

15 Claims, 5 Drawing Sheets

(51) Int. Cl.
    *H04W 64/00*   (2009.01)
    *H04W 84/12*   (2009.01)
    *H04W 48/20*   (2009.01)
(52) U.S. Cl.
    CPC ......... *H04W 64/00* (2013.01); *H04W 64/006* (2013.01); *H04W 48/20* (2013.01); *H04W 84/12* (2013.01)

(56) References Cited

U.S. PATENT DOCUMENTS

| | | |
|---|---|---|
| 9,713,074 B2 | 7/2017 | Yepeż |
| 2004/0110530 A1 | 6/2004 | Alone |
| 2006/0133330 A1 | 6/2006 | Chin |
| 2007/0066304 A1* | 3/2007 | Lee ................... H04W 48/20 455/436 |
| 2008/0014934 A1 | 1/2008 | Balasubramanian |
| 2010/0172274 A1* | 7/2010 | Wu ................... H04W 48/16 370/311 |
| 2010/0309815 A1 | 12/2010 | Yepez |
| 2012/0034922 A1 | 2/2012 | Jones |
| 2013/0235861 A1 | 9/2013 | Balasubramanian |
| 2014/0036705 A1* | 2/2014 | Ma .................... H04W 28/0231 370/252 |
| 2014/0079022 A1* | 3/2014 | Wang ............... H04W 36/22 370/331 |
| 2014/0087752 A1* | 3/2014 | Zhu .................. H04W 24/00 455/456.1 |
| 2014/0128102 A1* | 5/2014 | Finlow-Bates ....... H04W 48/08 455/456.3 |
| 2014/0179237 A1 | 6/2014 | Gao et al. |
| 2014/0274115 A1* | 9/2014 | Michalson ........... H04W 4/029 455/456.1 |
| 2014/0334465 A1* | 11/2014 | Lee .................. H04W 48/18 370/338 |
| 2014/0365669 A1 | 12/2014 | Shamis et al. |
| 2015/0189557 A1* | 7/2015 | Touati ............. H04W 36/0066 370/332 |
| 2015/0211845 A1* | 7/2015 | Le Grand ............. H04W 4/02 702/150 |
| 2015/0237595 A1* | 8/2015 | Le Grand ............. G01S 5/0252 370/338 |
| 2015/0382227 A1 | 12/2015 | Gao et al. |
| 2016/0066155 A1* | 3/2016 | Fan ................. G06F 3/0484 455/457 |
| 2016/0195400 A1* | 7/2016 | Young ................ G01C 21/206 701/409 |
| 2016/0262198 A1* | 9/2016 | Gardner, III ......... H04W 76/14 |
| 2016/0286483 A1* | 9/2016 | Bergstrom ........... H04W 48/18 |
| 2016/0353360 A1* | 12/2016 | Lee ................. H04W 48/16 |

FOREIGN PATENT DOCUMENTS

| | | |
|---|---|---|
| CN | 104782187 A | 7/2015 |
| CN | 106255106 A | 12/2016 |
| CN | 106658672 A | 5/2017 |
| EP | 1928125 A1 | 6/2008 |
| WO | 2006066181 A1 | 6/2006 |
| WO | 2008008987 A2 | 1/2008 |

OTHER PUBLICATIONS

English Translation of the Written Opinion of the International Search Authority in international application No. PCT/CN2017/104776, dated Jan. 4, 2018.
Supplementary European Search Report in European application No. 17191074.8, dated Jan. 12, 2018.

* cited by examiner

WIRELESS FIDELITY CONNECTION METHOD, MOBILE TERMINAL AND STORAGE MEDIUM

CROSS-REFERENCE TO RELATED APPLICATIONS

This application claims priority to Chinese Patent Application No. 201710091095.6 filed on Feb. 20, 2017, the disclosure of which is incorporated by reference herein in its entirety.

TECHNICAL FIELD

The present disclosure relates to the technical field of communications, and in particular to a Wireless Fidelity (Wi-Fi) connection method and a mobile terminal.

BACKGROUND

Along with rapid development of the information technology, use of mobile terminals (such as mobile phone and tablet computer) becomes increasingly popular. Requirements of users on mobile terminals increase, not only is the relatively high processing speed required, but also dependence on Wi-Fi becomes stronger and stronger. Along with popularization of mobile terminals and Wi-Fi, the event of accessing a Wi-Fi network through a mobile terminal occurs more and more frequently.

SUMMARY

A first aspect of the embodiments of the disclosure provides a Wi-Fi connection method, which includes: Wi-Fi scanning is performed to obtain Access Point (AP) information of M APs, where M is a positive integer; the AP information of N APs, of which signal strengths are higher than a first preset threshold value are selected from the AP information of the M APs, to generate a target Wi-Fi list, where N is a positive integer less than or equal to M; X Wi-Fi lists are determined from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and at least one Service Set Identifier (SSID) or Basic Service Set Identifier (BSSID) is selected in the X Wi-Fi lists to perform Wi-Fi scanning.

A second aspect of the embodiments of the disclosure provides a mobile terminal, which includes a processor and a memory, wherein the processor calls codes or instructions in the memory to execute a Wireless Fidelity (Wi-Fi) connection method described in the first aspect.

A third aspect of the embodiments of the disclosure provides a non-transitory computer readable storage medium, storing instructions, which, when executed by a processor, cause the processor to execute the method described in the first aspect.

BRIEF DESCRIPTION OF DRAWINGS

In order to describe the technical solutions in the embodiments of the disclosure more clearly, the drawings to be used for descriptions about the embodiments will be simply introduced below. Obviously, the drawings described below are some embodiments of the disclosure. Those skilled in the art may further obtain other drawings according to these drawings without creative work.

DETAILED DESCRIPTION

Figure 1:
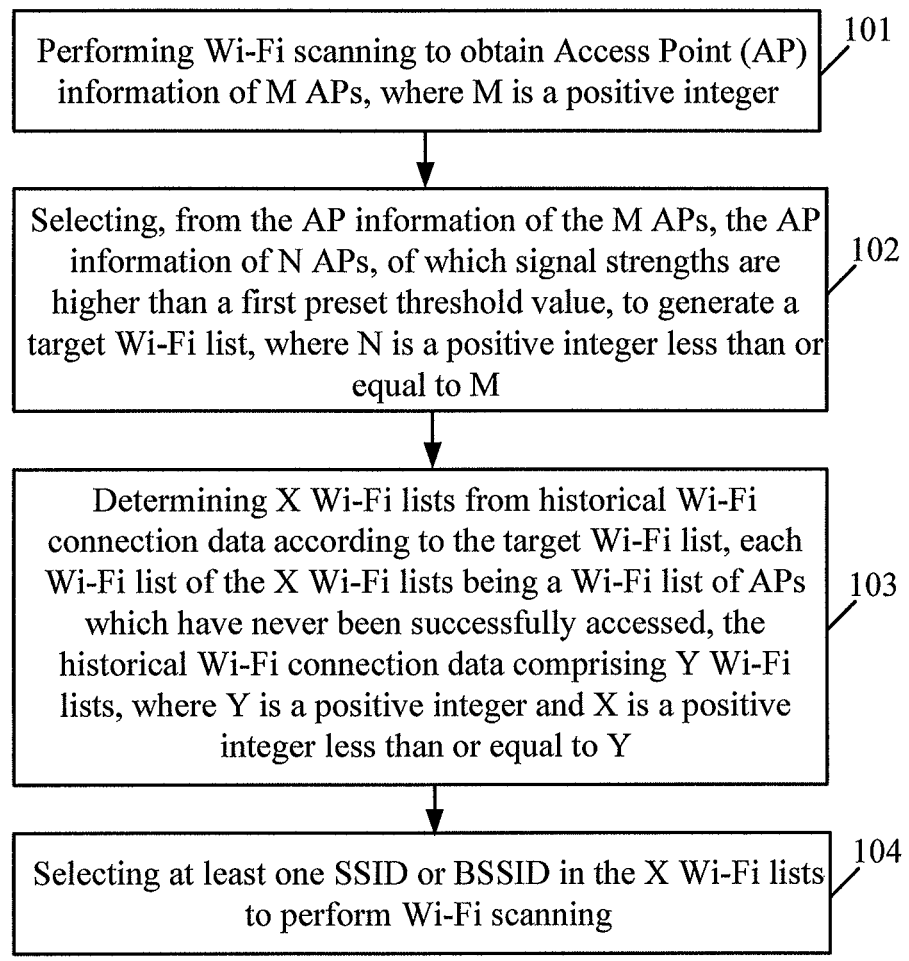
FIG. 1 illustrates a flowchart of a Wi-Fi connection method according to an embodiment of the disclosure.

The technical solutions in the embodiments of the disclosure will be clearly and completely described below in connection with the drawings in the embodiments of the disclosure. The described embodiments are not all embodiments but part of embodiments of the disclosure. All other embodiments obtained on the basis of the embodiments in the disclosure by those skilled in the art without creative work shall fall within the scope of protection of the disclosure.

Terms "first", "second", "third", "fourth" and the like in the specification, claims and drawings of the disclosure are intended not to describe a specific sequence but only to distinguish different objects. In addition, terms "include" and "have" and any variation thereof are intended to cover nonexclusive inclusions. For example, a process, method, system, product or equipment including a series of steps or units is not limited to the listed steps or units, but in at least one embodiment, may further include steps or units which are not listed, or may further include other steps or units intrinsic to the process, the method, the product or the equipment.

"Embodiment" mentioned in the disclosure means that specific characteristics, structures or properties described in connection with an embodiment may be included in at least one embodiment of the disclosure. This word displayed at each position in the specification does not refer to the same embodiment as well as an independent or alternate embodiment mutually exclusive to other embodiments. It may be explicitly and implicitly understood by those skilled in the art that the embodiments described in the disclosure may be combined with the other embodiments.

A mobile terminal described in the embodiments of the disclosure may include a smart phone (such as an Android phone, an iOS phone and a Windows phone), a tablet computer, a palmtop computer, a notebook computer, a Mobile Internet Device (MID), wearable equipment or the like, which are not exhausted by only listed as examples, and includes, but not limited to, the listed mobile terminals.

In the related art, a user may hide an Access Point (AP) to improve security of the AP. However, in a Wi-Fi scanning process, the following problem may occur: for example, for a certain AP, to which a mobile terminal has never been successfully connected yet, before the AP is hidden, the mobile terminal may find the AP during Wi-Fi scanning, and then display the AP in a screen of the mobile terminal; however, after the AP is hidden, the mobile terminal cannot find the AP.

Normally, when a specified AP is not manually added, the AP may not be displayed. Therefore, a hidden AP not stored by a mobile terminal may not be displayed in a Wi-Fi list after Wi-Fi scanning of the mobile terminal, and a user may not select such a specified AP, and may further not be connected to the specified AP. Moreover, it is relatively tedious to manually add the AP, since an SSID is required to be completely matched for displaying. If there is a special character (such as "イ" and "テ") or symbol (such as "*", "/" and "@") in the SSID, an error input rate is relatively high, causing that the user might have to input the specified AP for many times.

In at least one embodiment, historical Wi-Fi connection data in the embodiments of the disclosure may include multiple Wi-Fi connection lists, each Wi-Fi list may be a Wi-Fi list of APs which have never been successfully accessed, and the Wi-Fi list may include AP information of multiple APs. For example, after Wi-Fi scanning, a mobile terminal may obtain AP information of multiple APs, and may select APs of which signal strengths are higher than a certain preset threshold value to generate a Wi-Fi list. The AP information of the AP may include, but not limited to: an SSID, a BSSID, an encryption scheme and whether it is hidden or not (a hidden state or a non-hidden state). It is to be noted that, when a certain AP is in the hidden state, it is possible to find the AP only by performing Wi-Fi scanning according to an SSID or BSSID of the AP. In the embodiments of the disclosure, an AP which has never been successfully accessed refers to an AP to which the mobile terminal has not performed Wi-Fi connection, or, an AP to which the mobile terminal had initiated Wi-Fi connection but failed to access (see the below for details). An AP which has ever been successfully accessed refers to an AP to which the mobile terminal has successfully performed Wi-Fi connection. In a practical application, for another example, every time when the mobile terminal is intended to access an AP, it may select any AP from the Wi-Fi list, and generate a Wi-Fi list by virtue of AP information of multiple APs, of which signal strengths are higher than a certain threshold value, around the AP. For example, every time when the mobile terminal tries to access an AP (e.g., any available AP) but fails to access a certain AP, an attribute, such as an SSID, a BSSID, an encryption scheme and whether it is hidden or not, of the AP may be recorded, and AP information of multiple APs, of which signal strengths are higher than a certain threshold value, around the AP is selected to generate a Wi-Fi list. In such a manner, the historical Wi-Fi connection data may be obtained.

A Wi-Fi access process may include a scanning stage, an authentication stage and an association stage. An attempt to access an AP may start with the operation that a user manually inputs an SSID at the Wi-Fi connection interface displayed in the display screen of the mobile terminal. Then, the process may begin with the scanning stage. In the scanning stage, the mobile terminal may send a probe request to search for AP(s) with the same SSID as inputted. If the AP(s) with the same SSID are found, the mobile terminal selects one of the AP(s) with a highest received signal strength and then the process enters the authentication stage. Alternatively, an attempt to access an AP may start with the operation that a user selects an item from the Wi-Fi list shown in the Wi-Fi connection interface. In this case, the mobile terminal has already completed the scanning in order to provide the Wi-Fi list, and thus the process directly enters the authentication stage. In the authentication stage, the mobile terminal may send an authentication request to the AP, and if the authentication succeeds, the AP may return an authentication response. After the authentication is passed, the process enters the association stage in which the mobile terminal sends an association request to the AP and the AP may return an association response. At this time, the process is finished. In other words, reception of the association response indicates that the mobile terminal successfully accesses the AP. If there is no response from the AP during any of the three stages, it indicates that the mobile terminal tries but fails to access the AP.

According to some embodiments of the disclosure, a Wireless Fidelity (Wi-Fi) connection method is provided, in which Wi-Fi scanning is performed to obtain Access Point (AP) information of M APs, where M is a positive integer; the AP information of N APs, of which signal strengths are higher than a first preset threshold value are selected from the AP information of the M APs, to generate a target Wi-Fi list, where N is a positive integer less than or equal to M; X Wi-Fi lists are determined from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and at least one Service Set Identifier (SSID) or Basic Service Set Identifier (BSSID) is selected in the X Wi-Fi lists to perform Wi-Fi scanning. Therefore, when an AP which has never been successfully accessed is changed from a non-hidden state into a hidden state, the hidden AP which has never been successfully accessed can be scanned.

According to some embodiments of the disclosure, a mobile terminal is provided, which includes a processor and a memory, the processor calls codes or instructions in the memory to execute the Wireless Fidelity (Wi-Fi) connection method as described above.

According to some embodiments of the disclosure, a non-transitory computer readable storage medium is provided, the non-transitory computer readable storage medium stores instructions, which, when executed by a processor, cause the processor to execute the method as described above.

FIG. 1 illustrates a flowchart of a Wi-Fi connection method according to an embodiment of the disclosure. The Wi-Fi connection method described in the embodiment includes the following operations in blocks illustrated in FIG. 1. The method can begin at block 101.

At block 101, Wi-Fi scanning is performed to obtain AP information of M APs, where M is a positive integer.

Here, when a mobile terminal needs to access a Wi-Fi network, the mobile terminal may start its Wi-Fi module to perform Wi-Fi scanning, and after the Wi-Fi scanning, the mobile terminal may obtain the AP information of the multiple APs.

At block 102: the AP information of N APs, of which signal strengths are higher than a first preset threshold value, is selected from the AP information of the M APs, to generate a target Wi-Fi list, where N is a positive integer less than or equal to M.

Here, the mobile terminal may obtain the AP information of the multiple APs after the Wi-Fi scanning. However, not every AP is stable. Normally, if a distance between a certain AP and the mobile terminal is closer, its signal strength is stronger. If the AP information of the M APs is obtained during the Wi-Fi scanning, where M is a positive integer, the AP information of the N APs of which the signal strengths are higher than the first preset threshold value may be selected from the M APs, and the target Wi-Fi list is generated by virtue of the AP information of the N APs. Of course, the target Wi-Fi list may further be displayed in a screen of the mobile terminal. The first preset threshold value may be a system default value or set by a user.

In at least one embodiment, selection of the AP information of the N APs of which the signal strengths are higher than the first preset threshold value from the AP information of the M APs to generate the target Wi-Fi list in Step 102 may include the following operations.

At operation 21, a current position of a mobile terminal is acquired.

At operation 22, P APs positioned in a spatial range which is centered at the current position and in a radius of a preset length are selected from the M APs.

At operation 23, the N APs, of which the signal strengths are higher than the first preset threshold value, are selected from the P APs, and the corresponding AP information is acquired to generate the target Wi-Fi list.

Here, the mobile terminal may determine the current position of the mobile terminal through a Global Positioning System (GPS), or, the mobile terminal may determine the current position of the mobile terminal through a Wi-Fi positioning technology. The current position of the mobile terminal may be represented by a latitude and a longitude. For example, the current position may be represented to be 113° 46' east longitude and 22° 27' north latitude. Of course, if the current position of the mobile terminal is determined by adopting the Wi-Fi positioning technology, a position of a certain AP obtained by current Wi-Fi scanning is determined as the position of the mobile terminal, and the position of the AP, if being marked on an indoor map, may be represented as a point (i.e., the point representing the position of the mobile terminal). Furthermore, the P APs positioned in a spatial range which is centered at the current position and in a radius of a preset length may be selected from the M APs. Of course, the preset length may also be a system default value or set by the user, and may be, for example, 10 meters, 8 meters, 5 meters and 4.5 meters. The N APs, of which the signal strengths are higher than the first preset threshold value, may be selected from the P APs, and the corresponding AP information is acquired to generate the target Wi-Fi list.

At block 103, X Wi-Fi lists are determined from historical Wi-Fi connection data according to the target Wi-Fi list, each Wi-Fi list in the X Wi-Fi lists being a Wi-Fi list of APs which have never been successfully accessed, the historical Wi-Fi connection data including Y Wi-Fi lists, where Y is a positive integer and X is a positive integer less than or equal to Y.

Here, the historical Wi-Fi connection data may include the Y Wi-Fi lists, and Wi-Fi lists similar to the target Wi-Fi list may be matched from the Y Wi-Fi lists to obtain the X Wi-Fi lists, wherein X is a positive integer less than or equal to Y.

In at least one embodiment, the operation of determining the X Wi-Fi lists from the historical Wi-Fi connection data according to the target Wi-Fi list at block 103 may include the following operations.

At operation 31, a ratio of a number of APs, which are identical in the target Wi-Fi list and an ith Wi-Fi list in terms of both SSID and encryption scheme, to a total number of APs in the ith Wi-Fi list are determined, the ith Wi-Fi list being any Wi-Fi list in the historical Wi-Fi connection data.

At operation 32, when the ratio is higher than a second preset threshold value, the ith Wi-Fi list is reserved.

Here, the second preset threshold value may be set by the user or may be a system default value. The mobile terminal may determine the number of the APs, which are identical in the target Wi-Fi list and any Wi-Fi list in the historical Wi-Fi connection data in terms of both SSID and encryption scheme, calculate the ratio of the number of the APs to the number of the APs in the any Wi-Fi list and reserve the any Wi-Fi list when the ratio is higher than the second preset threshold value.

At block 104, at least one SSID or BSSID in the X Wi-Fi lists are selected to perform Wi-Fi scanning.

Here, the mobile terminal may extract the SSID or BSSID from the X Wi-Fi lists, and then may perform Wi-Fi scanning according to the SSID or the BSSID.

In at least one embodiment, the operation of selecting the at least one SSID or BSSID from the X Wi-Fi lists for Wi-Fi scanning at block 104 may include the following operations.

At operation 41, a selection command input by a user is received.

At operation 42, the at least one SSID or BSSID is selected from the X Wi-Fi lists, each SSID or BSSID corresponding to a recording time; and At operation 43, Wi-Fi scanning is performed according to the at least one SSID or BSSID in a descending order of closeness of the recording time to a current time.

Here, the user may input the selection command at operation 41, and may select the at least one SSID or BSSID from the X Wi-Fi lists according to the selection command at operation 42. Since each SSID or BSSID exists in a Wi-Fi list and the Wi-Fi list corresponds to a recording time (i.e., the time when the Wi-Fi list is generated), the corresponding SSID or BSSID may be selected for Wi-Fi scanning in a descending order of closeness of the recording time to a current time at operation 43.

In a specific implementation, for example, every time when clicking an AP for connection (no matter whether the connection is successful or not), the user records an attribute, such as an SSID, a BSSID, an encryption scheme and whether it is hidden or not, of the AP and stores it in a certain file of the mobile terminal, may store SSIDs and encryption schemes of surrounding APs of which signal strengths are higher than R (for example, −90 db) in a Wi-Fi list L, and then may store AP information and information stored in the Wi-Fi list L in a hash table (in a form like (AP information, Wi-Fi list L)). Scanned APs of which signal strengths are higher than R (for example, −90 db) may be selected and stored in a Wi-Fi list C according to currently scanned AP information. Then, members in the Wi-Fi list C may be matched with members in the Wi-Fi list L in the historical Wi-Fi connection data. for example, if 80% of the members in the Wi-Fi list C and the Wi-Fi list L are identical in terms of both SSID and encryption scheme, it may be considered that the matching is successful (that is, it may be considered that the two have the same Wi-Fi environment), and the corresponding SSIDs of the Wi-Fi list L are stored in a Wi-Fi list S after the successful Wi-Fi environment matching. SSIDs of APs in the Wi-Fi list S may sequentially be extracted for specified SSID scanning, and in such a manner, a hidden AP in the environment may be displayed.

In view of the above, according to the embodiment of the disclosure, Wi-Fi scanning is performed to obtain Access Point (AP) information of M APs, where M is a positive integer; the AP information of N APs, of which signal strengths are higher than a first preset threshold value are selected from the AP information of the M APs, to generate a target Wi-Fi list, where N is a positive integer less than or equal to M; X Wi-Fi lists are determined from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and at least one Service Set Identifier (SSID) or Basic Service Set Identifier (BSSID) is selected in the X Wi-Fi lists to perform Wi-Fi scanning. Therefore, when an AP which has never been successfully accessed is changed from a non-hidden state into a hidden state, the hidden AP which has never been successfully accessed can be scanned, and meanwhile, more APs can be scanned. Therefore, Wi-Fi connection efficiency can be improved.

Figure 2:
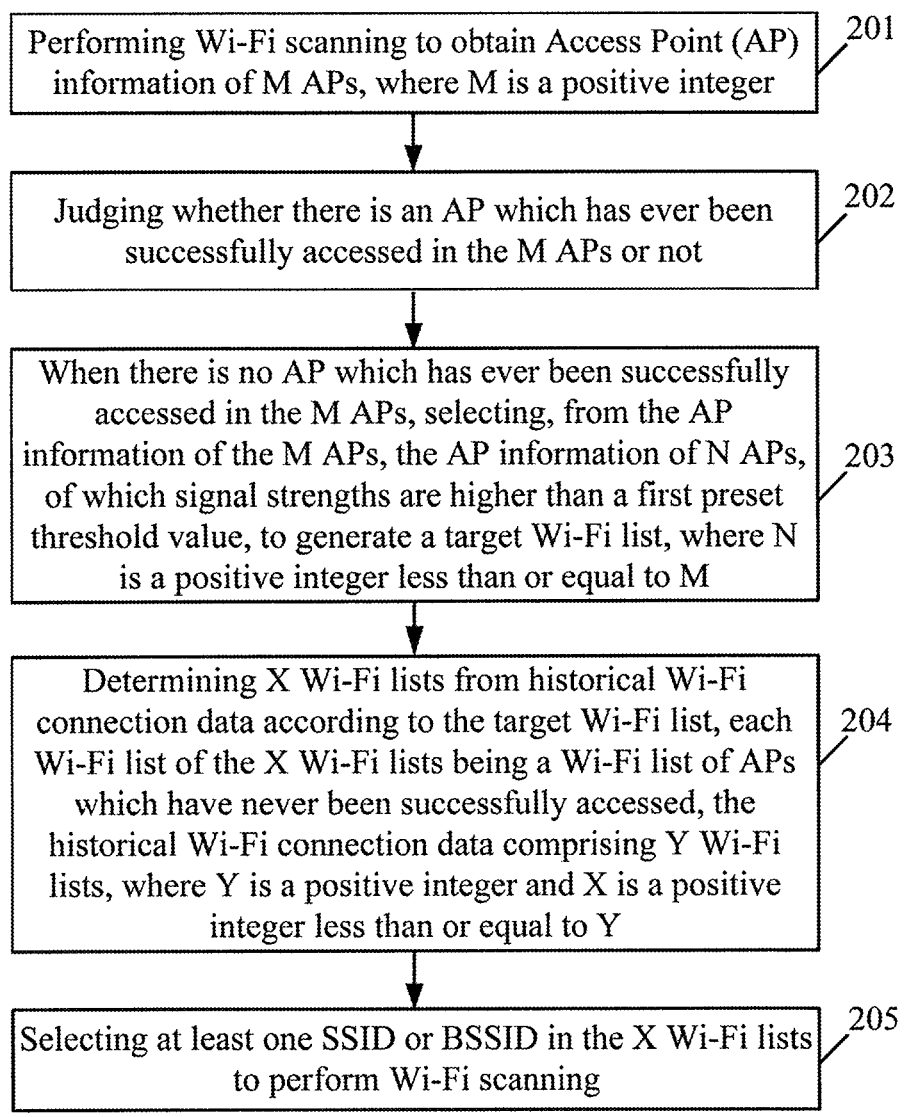
FIG. 2 illustrates a flowchart of a Wi-Fi connection method according to an embodiment of the disclosure.

FIG. 2 illustrates a flowchart of a Wi-Fi connection method according to an embodiment of the disclosure. The Wi-Fi connection method described in the embodiment includes the following operations in blocks illustrated in FIG. 2. The method can begin at block 201.

At block 201, Wi-Fi scanning is performed to obtain AP information of M APs, where M is a positive integer.

At block 202, it is judged whether there is an AP which has ever been successfully accessed in the M APs or not.

Here, the AP which has ever been successfully accessed refers to an AP on which Wi-Fi connection has ever been successfully performed.

At block 203, when there is no AP which has ever been successfully accessed in the M APs, the AP information of N APs of which signal strengths are higher than a first preset threshold value is selected from the AP information of the M APs to generate a target Wi-Fi list, where N is a positive integer less than or equal to M.

In at least one embodiment, when there is an AP which has ever been successfully accessed in the M APs, the AP which has ever been successfully accessed is directly accessed.

At block 204, X Wi-Fi lists are determined from historical Wi-Fi connection data according to the target Wi-Fi list, each Wi-Fi list in the X Wi-Fi lists being a Wi-Fi list corresponding to APs which have never been successfully accessed, the historical Wi-Fi connection data including Y Wi-Fi lists, Y being a positive integer and X being a positive integer less than or equal to Y.

At block 205, at least one SSID or BSSID in the X Wi-Fi lists are selected for Wi-Fi scanning.

Here, specific description of blocks 201 and 203-205 may refer to corresponding operations of the Wi-Fi connection method described in FIG. 1, and will not be elaborated herein.

According to the embodiment of the disclosure, Wi-Fi scanning is performed to obtain the AP information of the M APs, where M is a positive integer, it is judged whether there is an AP which has ever been accessed in the M APs or not, the AP information of the N APs of which the signal strengths are higher than the first preset threshold value is selected from the AP information of the M APs to generate the target Wi-Fi list, when there is no AP which has ever been accessed in the M APs, where N is a positive integer less than or equal to M, the X Wi-Fi lists are determined from the historical Wi-Fi connection data according to the target Wi-Fi list, each Wi-Fi list in the X Wi-Fi lists being a Wi-Fi list corresponding to the APs which have never been successfully accessed, the historical Wi-Fi connection data including Y Wi-Fi lists, Y being a positive integer and X being a positive integer less than or equal to Y, and the at least one SSID or BSSID in the X Wi-Fi lists is selected to perform Wi-Fi scanning. Thus, when the APs which have never been successfully accessed are changed from a non-hidden state into a hidden state, the hidden APs which have never been successfully accessed can be scanned, and meanwhile, more APs can be scanned. Therefore, Wi-Fi connection efficiency can be improved.

The below is a device for implementing the abovementioned Wi-Fi connection method, specifically as follows.

Figure 3A:
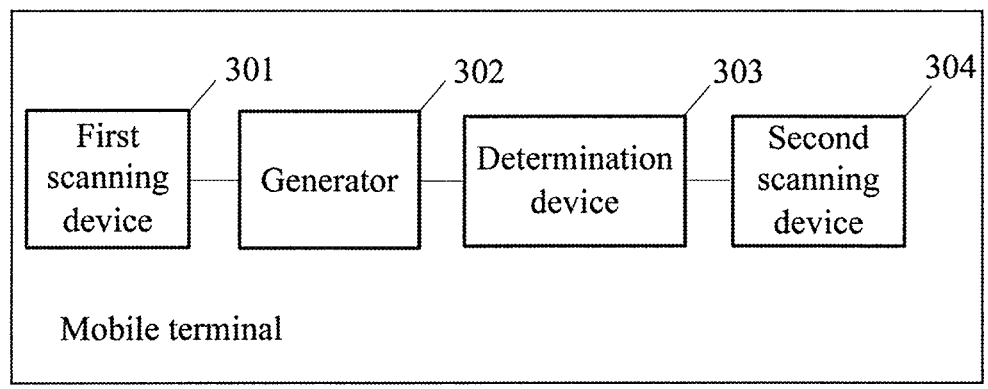
FIG. 3a illustrates a structure diagram of a mobile terminal according to an embodiment of the disclosure.

FIG. 3a illustrates a structure diagram of a mobile terminal according to an embodiment of the disclosure. The mobile terminal described in the embodiment includes: a first scanning device 301, a generator 302, a determination device 303 and a second scanning device 304, specifically as follows.

The first scanning device 301 is configured to perform Wi-Fi scanning to obtain AP information of M APs, where M is a positive integer.

The generator 302 is configured to select the AP information of N APs of which signal strengths are higher than a first preset threshold value from the AP information of the M APs to generate a target Wi-Fi list, where N is a positive integer less than or equal to M.

The determination device 303 is configured to determine X Wi-Fi lists from historical Wi-Fi connection data according to the target Wi-Fi list, each Wi-Fi list in the X Wi-Fi lists being a Wi-Fi list corresponding to APs which have never been successfully accessed, the historical Wi-Fi connection data including Y Wi-Fi lists, where Y is a positive integer and X is a positive integer less than or equal to Y.

The second scanning device 304 is configured to select at least one SSID or BSSID in the X Wi-Fi lists to perform Wi-Fi scanning.

Figure 3B:
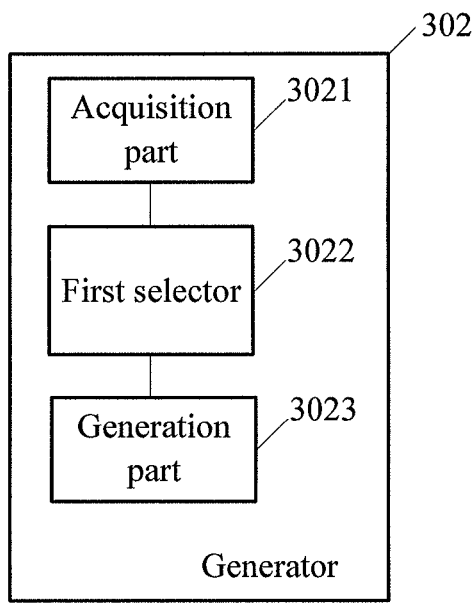
FIG. 3b illustrates a structure diagram of a generator of a mobile terminal described in FIG. 3a according to an embodiment of the disclosure.

In at least one embodiment, as shown in FIG. 3b, FIG. 3b illustrates a specific detailed structure of the generator 302 of the mobile terminal described in FIG. 3a. The generator 302 may include: an acquisition part 3021, a first selector 3044 and a generation part 3023, specifically as follows.

The acquisition part 3021 is configured to acquire a current position of a mobile terminal.

The first selector 3022 is configured to select, from the M APs, P APs positioned in a spatial range which is centered at the current position and in a radius of a preset length.

The generation part 3023 is configured to select, from the P APs, the N APs, of which the signal strengths are higher than the first preset threshold value, and acquiring the AP information corresponding to the N APs to generate the target Wi-Fi list.

Figure 3C:
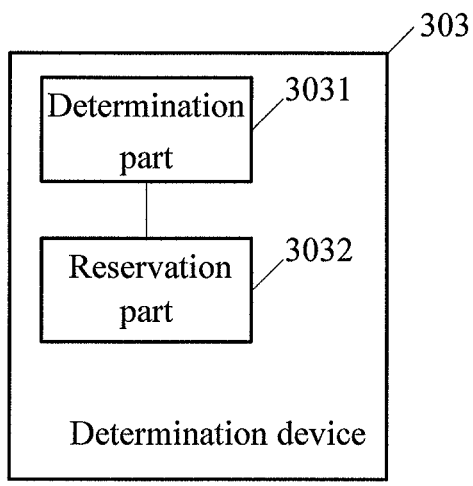
FIG. 3c illustrates a structure diagram of a determination device of a mobile terminal described in FIG. 3a according to an embodiment of the disclosure.

In at least one embodiment, as shown in FIG. 3c, FIG. 3c is a specific detailed structure of the determination device 303 of the mobile terminal described in FIG. 3a. The determination device 303 may include: a determination part 3031 and a reservation part 3032, specifically as follows.

The determination part 3031 is configured to determine a ratio of a number of APs, which are identical in the target Wi-Fi list and an ith Wi-Fi list in terms of both SSID and encryption scheme, to a total number of APs in the ith Wi-Fi list, the ith Wi-Fi list being any Wi-Fi list in the historical Wi-Fi connection data.

The reservation part 3032 is configured to, when the ratio is higher than a second preset threshold value, reserve the ith Wi-Fi list.

Figure 3D:
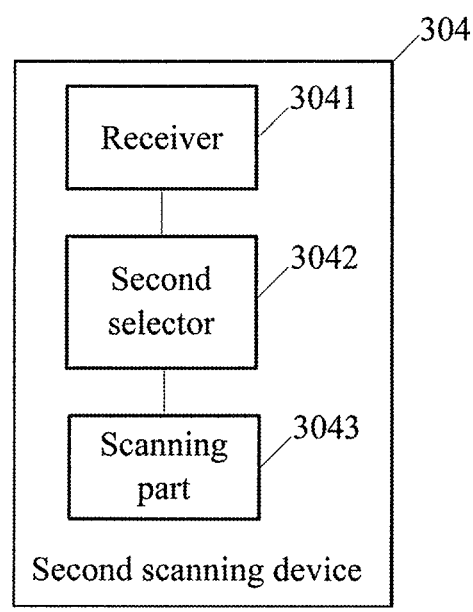
FIG. 3d illustrates a structure diagram of a second scanning device of a mobile terminal described in FIG. 3a according to an embodiment of the disclosure.

In at least one embodiment, as shown in FIG. 3d, FIG. 3d is a specific detailed structure of the second scanning device 304 of the mobile terminal described in FIG. 3a. The second scanning device 304 may include: a receiver 3041, a second selector 3042 and a scanning part 3043, specifically as follows.

The receiver 3041 is configured to receive a selection command input by a user.

The second selector 3042 is configured to select the at least one SSID or BSSID from the X Wi-Fi lists, each SSID or BSSID corresponding to a recording time.

The scanning part 3043 is configured to perform Wi-Fi scanning according to according to the at least one SSID or BSSID in a descending order of closeness of the recording time to a current time.

Figure 3E:
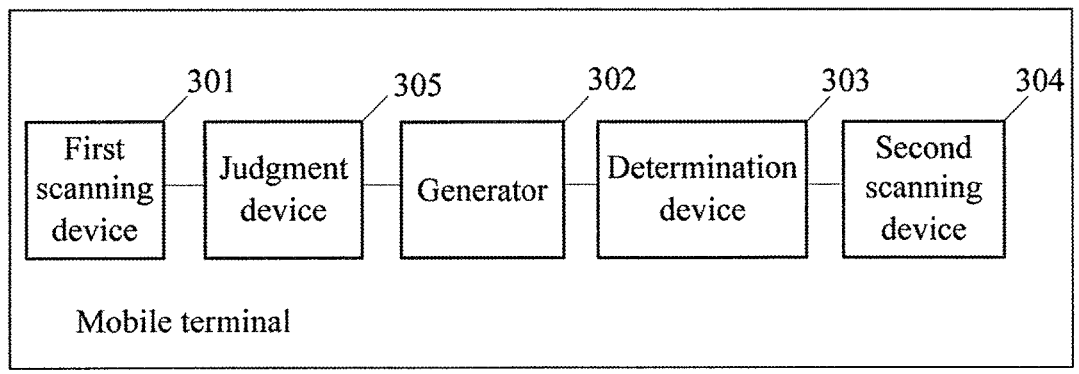
FIG. 3e illustrates another structure diagram of a mobile terminal described in FIG. 3a according to an embodiment of the disclosure.

In at least one embodiment, as shown in FIG. 3e, FIG. 3e is another variation structure of the mobile terminal described in FIG. 3a. Compared with FIG. 3a, the structure in FIG. 3e may further include: a judgment device 305, specifically as follows.

The judgment device 305 is configured to, after the first scanning device 301 performs Wi-Fi scanning to obtain the AP information of the M APs, judge whether there is an AP which has ever been successfully accessed in the M APs or not, and when a judgment result of the judgment device indicates that there is no AP which has ever been successfully accessed in the M APs, the generator 302 executes selection of the AP information of the N APs of which the signal strengths are higher than the first preset threshold value from the AP information of the M APs to generate the target Wi-Fi list.

According to the mobile terminal described in the embodiment of the disclosure, Wi-Fi scanning is performed to obtain Access Point (AP) information of M APs, where M is a positive integer; the AP information of N APs, of which signal strengths are higher than a first preset threshold value are selected from the AP information of the M APs, to generate a target Wi-Fi list, where N is a positive integer less than or equal to M; X Wi-Fi lists are determined from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and at least one Service Set Identifier (SSID) or Basic Service Set Identifier (BSSID) is selected in the X Wi-Fi lists to perform Wi-Fi scanning. Therefore, when an AP which has never been successfully accessed is changed from a non-hidden state into a hidden state, the hidden AP which has never been successfully accessed can be scanned, and meanwhile, more APs can be scanned. Therefore, Wi-Fi connection efficiency can be improved.

Figure 4:
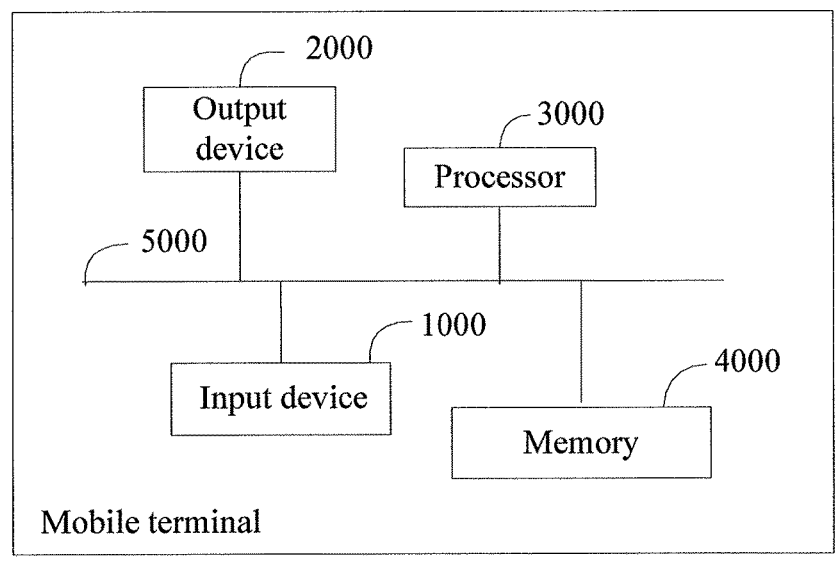
FIG. 4 illustrates a structure diagram of a mobile terminal according to an embodiment of the disclosure.

FIG. 4 is a structure diagram of a mobile terminal according to an embodiment of the disclosure. The mobile terminal described in the embodiment includes: at least one piece of input device 1000, at least one piece of output device 2000, at least one processor 3000, such as a Central Processing Unit (CPU), and a memory 4000, the input device 1000, the output device 2000, the processor 3000 and the memory 4000 being connected through a bus 5000.

The input device 1000 may specifically be a touch panel, a physical button or a mouse.

The output device 2000 may specifically be a display screen.

The memory 4000 may be a high-speed Random Access Memory (RAM), or may be a non-volatile memory, such as a disk memory. The memory 4000 is configured to store a set of program codes, and the input device 1000, the output device 2000 and the processor 3000 are configured to call the program codes stored in the memory 4000 to execute the following operations.

The processor 3000 is configured to perform Wi-Fi scanning to obtain Access Point (AP) information of M APs, where M is a positive integer; select, from the AP information of the M APs, the AP information of N APs, of which signal strengths are higher than a first preset threshold value, to generate a target Wi-Fi list, where N is a positive integer less than or equal to M; determine X Wi-Fi lists from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and select at least one Service Set Identifier (SSID) or Basic Service Set Identifier (BSSID) in the X Wi-Fi lists to perform Wi-Fi scanning.

In at least one embodiment, the operation that the processor 3000 selects, from the AP information of the M APs, the AP information of N APs, of which signal strengths are higher than a first preset threshold value, to generate a target Wi-Fi list includes that: a current position of the mobile terminal is acquired; P APs positioned in a spatial range which is centered at the current position and in a radius of a preset length are selected from the M APs; and the N APs of which the signal strengths are higher than the first preset threshold value are selected from the P APs, and the corresponding AP information are acquired to generate the target Wi-Fi list.

In at least one embodiment, the operation that the processor 3000 determines the X Wi-Fi lists from the historical Wi-Fi connection data according to the target Wi-Fi list includes that: a ratio of a number of APs, which are identical in the target Wi-Fi list and an ith Wi-Fi list in terms of both SSID and encryption scheme, to a total number of APs in the ith Wi-Fi list is determined, the ith Wi-Fi list being any Wi-Fi list in the historical Wi-Fi connection data; and when the ratio is higher than a second preset threshold value, the ith Wi-Fi list is reserved.

In at least one embodiment, the processor 3000 is further specifically configured to, after performing Wi-Fi scanning to obtain the AP information of the M APs and before selecting the AP information of the N APs of which the signal strengths are higher than the first preset threshold value from the AP information of the M APs to generate the target Wi-Fi list, judge whether there is an AP which has ever been successfully accessed in the M APs or not; and when there is no AP which has ever been successfully accessed in the M APs, execute selection of the AP information of the N APs of which the signal strengths are higher than the first preset threshold value from the AP information of the M APs to generate the target Wi-Fi list.

In at least one embodiment, the operation that the processor 3000 selects the at least one SSID or BSSID in the X Wi-Fi lists for Wi-Fi scanning includes that: a selection command input by a user is received; the at least one SSID or BSSID is selected from the X Wi-Fi lists, each SSID or BSSID corresponding to a recording time; and Wi-Fi scanning is performed according to the at least one SSID or BSSID in a descending order of closeness of the recording time to a current time.

An embodiment of the disclosure further provides a computer storage medium, wherein the computer storage medium may store a program, and when the program is executed, part or all of steps of any Wi-Fi connection method recorded in the abovementioned method embodiments are included.

Although the disclosure is described herein in connection with each embodiment, those skilled in the art may understand and implement other variations of the disclosed embodiments by viewing the drawings, the disclosed contents and the appended claims in a process of implementing the invention sought for protection. In the claims, "comprising" does not exclude other parts or steps, and "a" or "one" does not exclude a multiple condition. A single processor or another unit may realize a plurality of functions listed in the claims. Some measures are recorded in different claims, but it does not mean that these measures cannot be combined to achieve good effects.

Those skilled in the art should know that the embodiment of the disclosure may be provided as a method, a device (equipment) or a computer program product. Therefore, the disclosure may adopt a form of pure hardware embodiment, pure software embodiment or combined software and hardware embodiment. Moreover, the disclosure may adopt a form of computer program product implemented on one or more computer-available storage media (including, but not limited to, a disk memory, a Compact Disc Read-Only Memory (CD-ROM) and an optical memory) including computer-available program codes. The computer program is stored/distributed in a proper medium and is provided together with other hardware or serves as a part of the hardware, and may also be distributed in another form, for example, through the Internet or another wired or wireless telecommunication system.

The disclosure is described in connection with flowcharts and/or block diagrams of the method, device (equipment) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

Although the invention is described in connection with specific characteristics and the embodiments, obviously, various modifications and combinations may be made to the invention without departing from the spirit and scope of the invention. Correspondingly, the specification and the drawings are only exemplary descriptions about the disclosure defined by the appended claims, and are considered to cover any and all modifications, variations, combinations or equivalents in the scope of the invention. Obviously, those skilled in the art may make various modifications and transformations to the invention without departing from the spirit and scope of the invention. Therefore, if these modifications and transformations of the invention belong to the scope of the claims of the invention and equivalent technologies thereof, the invention is also intended to include these modifications and transformations.

The invention claimed is:

1. A Wireless Fidelity (Wi-Fi) connection method, applied to a mobile terminal, the method comprising:
    performing Wi-Fi scanning to obtain Access Point (AP) information of M APs, where M is a positive integer;
    selecting, from the AP information of the M APs, the AP information of N APs, of which signal strengths are higher than a first preset threshold value, to generate a target Wi-Fi list, where N is a positive integer less than or equal to M;
    determining X Wi-Fi lists from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and
    selecting at least one Service Set Identifier (SSID) or Basic Service Set Identifier (BSSID) in the X Wi-Fi lists to perform Wi-Fi scanning.

2. The method according to claim 1, wherein the selecting, from the AP information of the M APs, the AP information of N APs, of which signal strengths are higher than a first preset threshold value, to generate a target Wi-Fi list comprises:
    acquiring a current position of the mobile terminal;
    selecting, from the M APs, P APs positioned in a spatial range which is centered at the current position and in a radius of a preset length; and
    selecting, from the P APs, the N APs, of which the signal strengths are higher than the first preset threshold value, and acquiring the AP information corresponding to the N APs to generate the target Wi-Fi list.

3. The method according to claim 1, wherein the determining X Wi-Fi lists from historical Wi-Fi connection data according to the target Wi-Fi list comprises:
    determining a ratio of a number of APs, which are identical in the target Wi-Fi list and an ith Wi-Fi list in terms of both SSID and encryption scheme, to a total number of APs in the ith Wi-Fi list, the ith Wi-Fi list being any Wi-Fi list in the historical Wi-Fi connection data; and
    hen the ratio is higher than a second preset threshold value, determining the ith Wi-Fi list to be one of the X Wi-Fi lists.

4. The method according to claim 1, wherein the selecting at least one SSID or BSSID in the X Wi-Fi lists to perform Wi-Fi scanning comprises:
    receiving a selection command;
    selecting the at least one SSID or BSSID from the X Wi-Fi lists according to the selection command, each SSID or BSSID corresponding to a recording time; and
    performing Wi-Fi scanning according to the at least one SSID or BSSID in a descending order of closeness of the recording time to a current time.

5. The method according to claim 1, wherein after performing Wi-Fi scanning to obtain the AP information of the M APs and before selecting the AP information of the N APs of which the signal strengths are higher than the first preset threshold value from the AP information of the M APs, to generate a target Wi-Fi list, the method further comprises:
 judging whether there is an AP which has ever been successfully accessed in the M APs or not; and
 when there is no AP which has ever been successfully accessed in the M APs, executing selection of the AP information of the N APs of which the signal strengths are higher than the first preset threshold value from the AP information of the M APs to generate the target Wi-Fi list.

6. A mobile terminal, comprising:
a processor; and
a memory,
 wherein the processor calls codes or instructions in the memory to execute a Wireless Fidelity (Wi-Fi) connection method, the method comprising:
 performing Wireless Fidelity (Wi-Fi) scanning to obtain Access Point (AP) information of M APs, where M is a positive integer;
 selecting, from the AP information of the M APs, the AP information of N APs, of which signal strengths are higher than a first preset threshold value, to generate a target Wi-Fi list, where N is a positive integer less than or equal to M;
 determining X Wi-Fi lists from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and
 selecting at least one Service Set Identifier (SSID) or Basic Service Set Identifier (BSSID) in the X Wi-Fi lists to perform Wi-Fi scanning.

7. The mobile terminal according to claim 6, wherein the selecting, from the AP information of the M APs, the AP information of N APs, of which signal strengths are higher than a first preset threshold value, to generate a target Wi-Fi list comprises:
 acquiring a current position of the mobile terminal;
 electing, from the M APs, P APs positioned in a spatial range which is centered at the current position and in a radius of a preset length; and
 selecting, from the P APs, the N APs, of which the signal strengths are higher than the first preset threshold value, and acquiring the AP information corresponding to the N APs to generate the target Wi-Fi list.

8. The mobile terminal according to claim 6, wherein the determining X Wi-Fi lists from historical Wi-Fi connection data according to the target Wi-Fi list comprises:
 determining a ratio of a number of APs, which are identical in the target Wi-Fi list and an ith Wi-Fi list in terms of both SSID and encryption scheme to a total number of APs in the ith Wi-Fi list, the ith Wi-Fi list being any Wi-Fi list in the historical Wi-Fi connection data; and
 when the ratio is higher than a second preset threshold value, determine the ith Wi-Fi list to be one of the X Wi-Fi lists.

9. The mobile terminal according to claim 6, wherein the selecting at least one SSID or BSSID in the X Wi-Fi lists to perform Wi-Fi scanning comprises:
 receiving a selection command;
 selecting the at least one SSID or BSSID from the X Wi-Fi lists according to the selection command, each SSID or BSSID corresponding to a recording time; and
 performing Wi-Fi scanning according to the at least one SSID or BSSID in a descending order of closeness of the recording time to a current time.

10. The mobile terminal according to claim 6, wherein the method further comprises:
 after performing Wi-Fi scanning to obtain the AP information of the M APs, judging whether there is an AP which has ever been successfully accessed in the M APs or not,
 wherein when a judgment result indicates that there is no AP which has ever been successfully accessed in the M APs, executing selection of the AP information of the N APs of which the signal strengths are higher than the first preset threshold value from the AP information of the M APs to generate the target Wi-Fi list.

11. A non-transitory computer readable storage medium, storing instructions, which, when executed by a processor, cause the processor to execute a Wireless Fidelity (Wi-Fi) connection method, the method comprising:
 performing Wi-Fi scanning to obtain Access Point (AP) information of M APs, where M is a positive integer;
 selecting, from the AP information of the M APs, the AP information of N APs, of which signal strengths are higher than a first preset threshold value, to generate a target Wi-Fi list, where N is a positive integer less than or equal to M;
 determining X Wi-Fi lists from historical Wi-Fi connection data according to the target Wi-Fi list, each Wi-Fi list of the X Wi-Fi lists being a Wi-Fi list of APs which have never been successfully accessed, the historical Wi-Fi connection data comprising Y Wi-Fi lists, where Y is a positive integer and X is a positive integer less than or equal to Y; and
 selecting at least one Service Set Identifier (SSID) or Basic Service Set Identifier (BSSID) in the X Wi-Fi lists to perform Wi-Fi scanning.

12. The non-transitory computer readable storage medium according to claim 11, wherein the selecting, from the AP information of the M APs, the AP information of N APs, of which signal strengths are higher than a first preset threshold value, to generate a target Wi-Fi list comprises:
 acquiring a current position of the mobile terminal;
 selecting, from the M APs, P APs positioned in a spatial range which is centered at the current position and in a radius of a preset length; and
 selecting, from the P APs, the N APs, of which the signal strengths are higher than the first preset threshold value, and acquiring the AP information corresponding to the N APs to generate the target Wi-Fi list.

13. The non-transitory computer readable storage medium according to claim 11, wherein the determining X Wi-Fi lists from historical Wi-Fi connection data according to the target Wi-Fi list comprises:
 determining a ratio of a number of APs, which are identical in the target Wi-Fi list and an ith Wi-Fi list in terms of both SSID and encryption scheme, to a total number of APs in the ith Wi-Fi list, the ith Wi-Fi list being any Wi-Fi list in the historical Wi-Fi connection data; and
 when the ratio is higher than a second preset threshold value, determining the ith Wi-Fi list to be one of the X Wi-Fi lists.

14. The non-transitory computer readable storage medium according to claim 11, wherein the selecting at least one SSID or BSSID in the X Wi-Fi lists to perform Wi-Fi scanning comprises:
 receiving a selection command;

selecting the at least one SSID or BSSID from the X Wi-Fi lists according to the selection command, each SSID or BSSID corresponding to a recording time; and performing Wi-Fi scanning according to the at least one SSID or BSSID in a descending order of closeness of the recording time to a current time.

15. The non-transitory computer readable storage medium according to claim 11, wherein after performing Wi-Fi scanning to obtain the AP information of the M APs and before selecting the AP information of the N APs of which the signal strengths are higher than the first preset threshold value from the AP information of the M APs, to generate a target Wi-Fi list, the method further comprises:

judging whether there is an AP which has ever been successfully accessed in the M APs or not; and when there is no AP which has ever been successfully accessed in the M APs, executing selection of the AP information of the N APs of which the signal strengths are higher than the first preset threshold value from the AP information of the M APs to generate the target Wi-Fi list.

\* \* \* \* \*